United States Patent [19]

Wilson

[11] Patent Number: 5,195,561
[45] Date of Patent: Mar. 23, 1993

[54] TETHERED COVER DEVICE FOR A PNEUMATIC TIRE VALVE

[76] Inventor: Scott A. Wilson, 1218 Alexandria, Lafayette, Colo. 80026

[21] Appl. No.: 791,473

[22] Filed: Nov. 8, 1991

[51] Int. Cl.$^5$ .............................................. F16L 55/10
[52] U.S. Cl. .................................. 138/89.2; 24/17 B; 301/5 VH; 301/37 SA
[58] Field of Search ........................ 301/5 VH, 37 SA; 138/89.1, 89.2, 89.3, 89.4; 24/17 B, 300, 301, 115 K

[56] References Cited

U.S. PATENT DOCUMENTS

| | | | |
|---|---|---|---|
| 562,282 | 6/1896 | Dale, Jr. ............................ | 138/89.3 |
| 577,122 | 2/1897 | Washburn ......................... | 138/89.3 |
| 610,924 | 9/1898 | Sloper ............................... | 138/89.3 |
| 1,512,662 | 10/1924 | Atkinson et al. ................ | 138/89.4 |
| 1,881,362 | 10/1932 | Kimball ............................ | 138/89.3 |
| 1,966,506 | 7/1934 | Knudsen .......................... | 138/89.3 |
| 2,044,837 | 6/1936 | Davis ........................... | 138/89.3 X |
| 2,224,364 | 12/1940 | Welty ............................... | 138/89.3 |
| 2,244,465 | 6/1941 | Lippe ............................... | 138/89.3 |
| 2,672,160 | 3/1954 | Wrabel ............................. | 138/89.2 |
| 2,859,777 | 11/1958 | Brewington ..................... | 138/89.2 |
| 2,963,046 | 12/1960 | Goodrich ......................... | 138/89.2 |
| 4,342,438 | 8/1982 | Speedie ........................... | 24/17 A X |
| 4,569,108 | 2/1986 | Schwab ........................... | 24/17 B X |
| 4,570,368 | 2/1986 | Stover ............................ | 24/16 PB X |
| 4,631,783 | 12/1986 | Hayashi ........................... | 24/16 PB |

FOREIGN PATENT DOCUMENTS

| | | | |
|---|---|---|---|
| 20211 | of 1897 | United Kingdom ............... | 138/89.3 |
| 5878 | of 1908 | United Kingdom ............... | 138/89.3 |

*Primary Examiner*—Russell D. Stormer
*Attorney, Agent, or Firm*—John R. Flanagan

[57] ABSTRACT

A cover device for protecting a pneumatic tire valve end has a hollow semi-flexible semi-rigid cap and an elongated flexible retaining member integrally attached to the cap. The cap is configured to be releasably force-fitted over the end of the valve to protect the valve end. The retaining member is configured to bend and encircle and thereby attach to either the valve itself or to a tire spoke disposed adjacent to the valve in order to tether the cap to either of these locations such that when the cap is removed from the valve end it is suspended in space adjacent to the valve end by the retaining member.

18 Claims, 2 Drawing Sheets

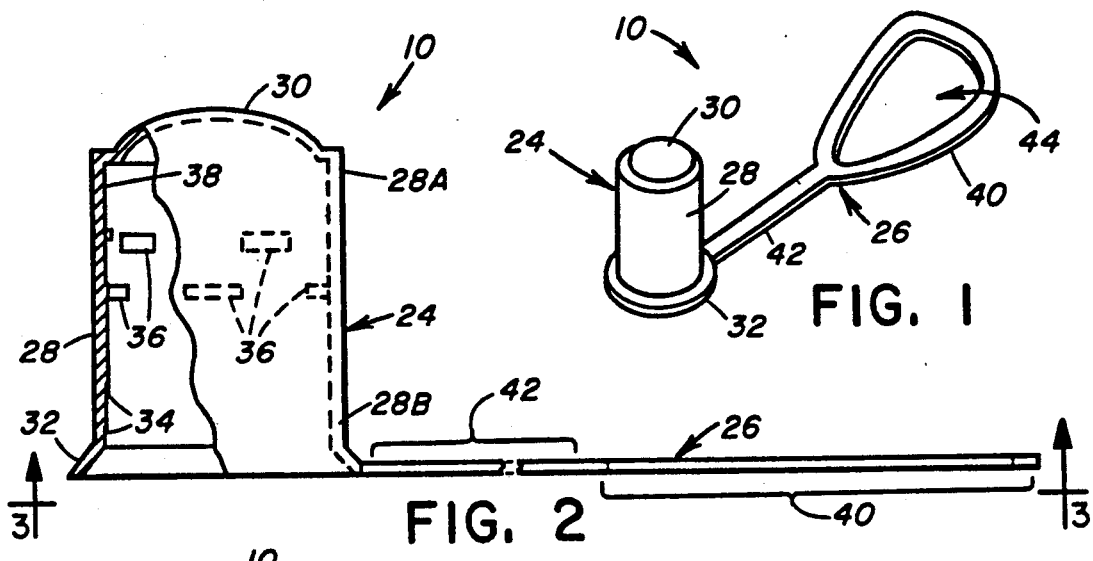
FIG. 1
FIG. 2
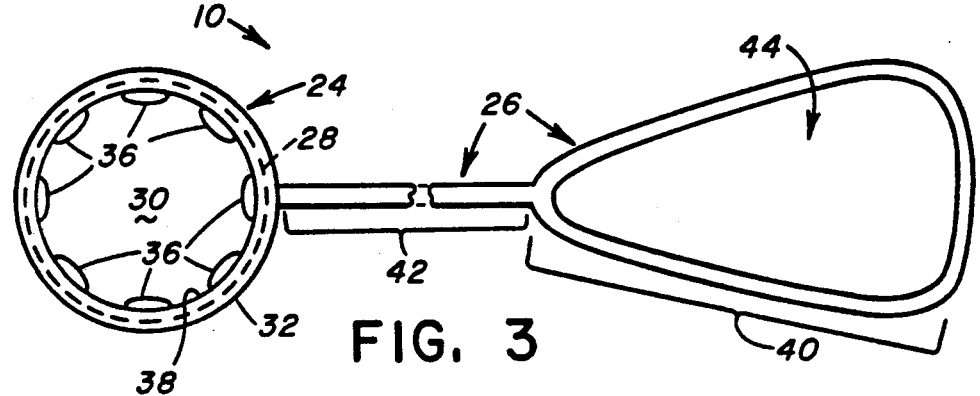
FIG. 3
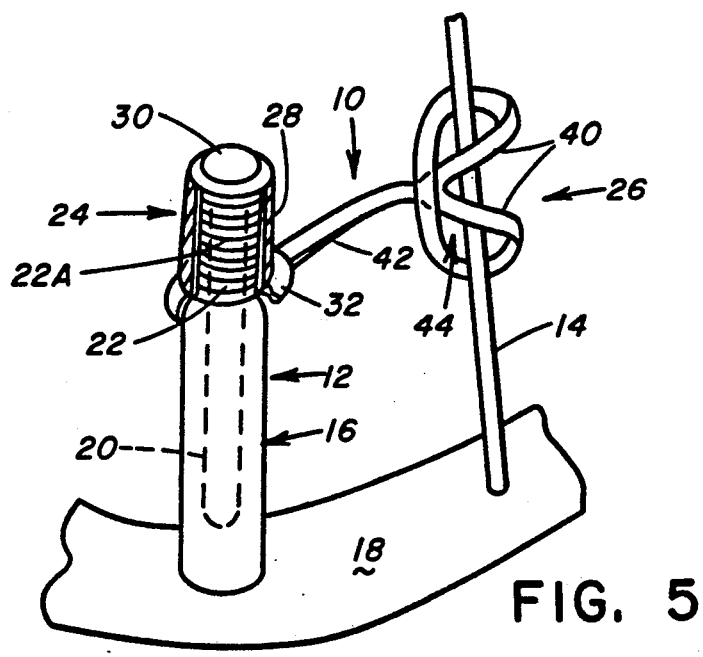
FIG. 5

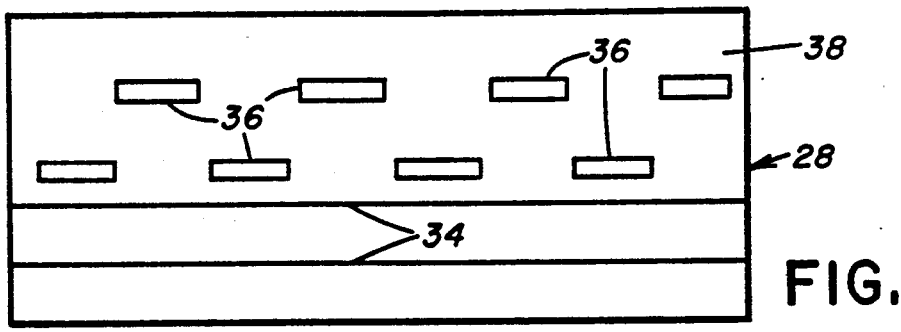
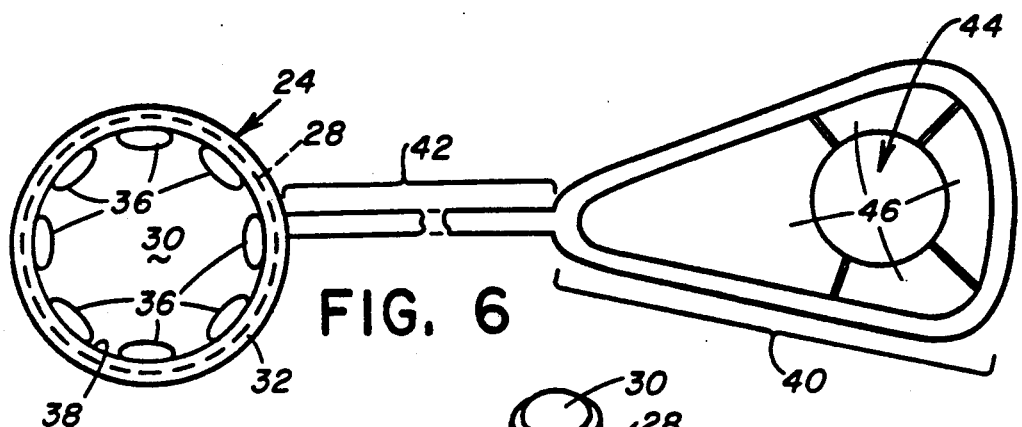
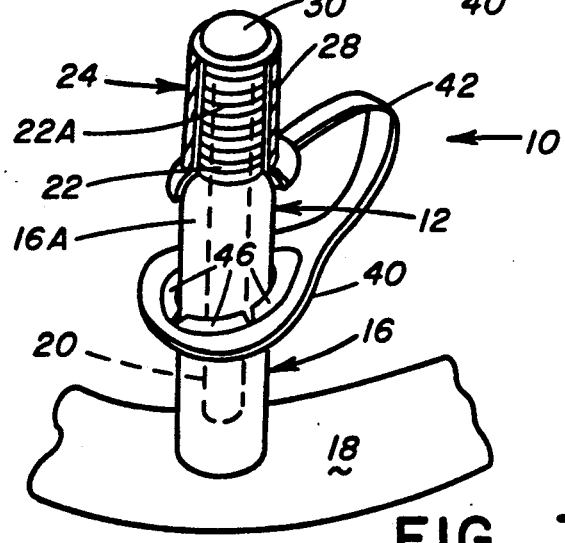
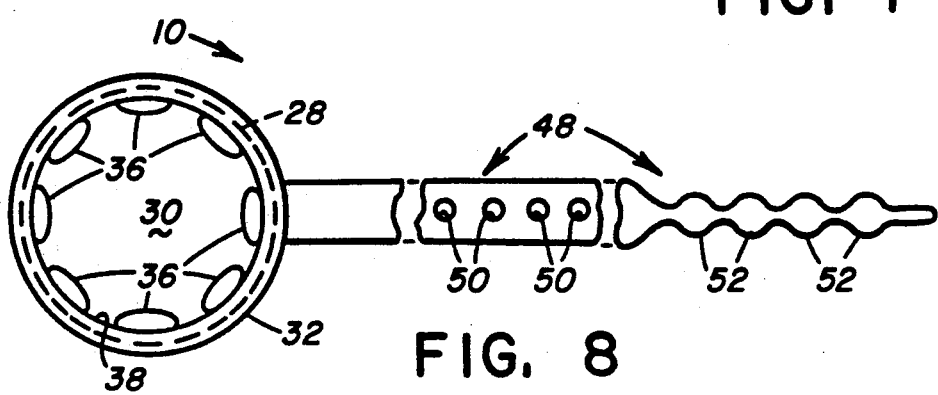

TETHERED COVER DEVICE FOR A PNEUMATIC TIRE VALVE

BACKGROUND OF THE INVENTION

1. Field of the Invention

The present invention generally relates to devices for covering ends of valves on pneumatic tires and, more particularly, to a tethered cover device for protecting an end of a pneumatic tire valve.

2. Description of the Prior Art

Pneumatic tires for bicycles, cars, trucks and the like typically have an elongated valve extending from the sidewall of the tire for use in inflating the tire. The valve is comprised of an elongated hollow stem attached to the tire sidewall and a valve mechanism housed in the stem and accessible through an externally-threaded outer end of the stem. An internally-threaded cap separate from the valve stem is usually employed for threading over the outer end of the stem in order to enclose it and thereby prevent entry of dirt and other foreign matter into the valve mechanism which over time may render the valve mechanism inoperable or cause it to leak air and deflate the tire.

In order to inflate the tire, it is necessary to remove the cap from the outer end of the valve stem for exposing the valve mechanism to mate a pressurized air supply nozzle with it. It is a customary practice to lay the valve cap on the ground or some other nearby area while the tire is being inflated or the pressure is being checked. Frequently, the valve cap falls or rolls and becomes lost. At other times, the valve cap may become covered with dirt so that when reapplied to the valve stem the valve mechanism becomes contaminated with dirt.

Over the years, the above-described problems have been addressed by prior art devices of many different designs for covering the end of a pneumatic tire valve stem and for attachment to the valve stem itself to avoid loss. Representative of these prior art devices are the ones disclosed in British Patent No. 5,878 to Hutchinson and in U.S. Pat. Nos. to Dale, Jr. (562,282), Washburn (577,122), Sloper (610,924), Atkinson et al (1,512,662), Kimball (1,881,362), Knudsen (1,966,506), Lippe (2,244,465) and Goodrich (2,963,046). While these prior art devices may have functioned satisfactorily under the limited range of conditions for which they were intended, they are not believed to provide an effective solution to the problems described above. Consequently, a need still exists for a valve stem cover device which will overcome these problems.

SUMMARY OF THE INVENTION

The present invention provides a tethered cover device designed to satisfy this need. The cover device of the present invention can be made of a durable plastic material and can be fabricated using conventional molding techniques which allow production in large quantities at low unit cost.

Accordingly, the present invention is primarily directed to a cover device for protecting a valve end on a pneumatic tire having a plurality of spokes. The cover device basically comprises a hollow semi-flexible semi-rigid cap removably insertable over an end of a valve of a pneumatic tire, and means for flexibly interconnecting the cap to a spoke of the tire such that the cap remains attached to the spoke regardless of whether the cap is inserted on or removed from the end of the tire valve.

More particularly, the cap includes an annular sidewall being open at a first end, and an end wall attached to and closing a second end of the sidewall being opposite from the open first end thereof. The cap sidewall has a pattern of protrusions formed on an interior surface thereof for providing a releasable force-fitted connection with external threads on the end of the valve. The means for flexibly interconnecting the cap with a tire spoke is an elongated flexible retaining member attached to the cap.

The present invention is directed to a cover device for protecting the end of the tire valve which can be tethered to either the tire spoke or the tire valve itself. The cover device basically comprises a hollow semi-flexible semi-rigid cap, and an elongated flexible retaining member integrally attached to the cap. The cap can be releasably force-fitted over the end of the valve. The retaining member is bendable to encircle and thereby attach to either the tire valve itself or to a tire spoke disposed adjacent to the valve. In such manner, the cap is tethered to either one of the spoke or the valve such that when removed from the valve end the cap is suspended in space adjacent to the valve end by the retaining member.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a cover device for an end of a pneumatic tire valve in accordance with the present invention.

FIG. 2 is an enlarged side elevational view, partly in section, of the cover device of FIG. 1.

FIG. 3 is a bottom plan view of the cover device as seen along line 3—3 of FIG. 2.

FIG. 4 is a layout view of a hollow cup of the cover device to illustrate the pattern of grooves and protrusions formed on its interior surface.

FIG. 5 is a perspective view of the cover device applied to the tire valve stem and tethered to a spoke of the tire.

FIG. 6 is a bottom plan view of a modification of the cover device of FIG. 3.

FIG. 7 is a perspective view of the modified cover device of FIG. 6 applied over and tethered to the tire valve stem.

FIG. 8 is a bottom plan view of an alternative embodiment of the cover device.

DETAILED DESCRIPTION OF THE PREFERRED EMBODIMENT

Referring to the drawings, and particularly to FIGS. 1 through 5, there is illustrated a tethered cover device, generally designated 10, of the present invention which is adapted to protect a valve 12 of a pneumatic tire (not shown) having a plurality of spokes 14 (only one being partially shown in FIG. 5) or being spokeless. The valve 12 of the tire is conventional in construction, typically being composed of an elongated hollow stem 16 attached to the tire sidewall 18 and a valve mechanism 20 housed in the stem 16 and accessible through an externally threaded outer end 22 of the valve stem 16.

The valve cover device 10 is adapted to protect the outer end 22 of the valve stem 16 and can be tethered to either the tire spoke 14, if available on the tire, or to the tire valve 12 itself. Basically, the cover device 10 includes a hollow semi-flexible semi-rigid cap 24 removably insertable over the valve stem end 22 and means in the form of an elongated flexible retaining member 26 integrally attached to the cap 24 for interconnecting the cap 24 to the tire spoke 14 or valve stem 16 such that the cap 24 remains tethered or attached to the spoke 14 or stem 16 regardless of whether the cap 24 is inserted on or removed from the end 22 of the tire valve stem 16. The cap 24 is configured to be releasably force-fitted over the end 22 of the valve stem 16. The flexible retaining member 26 is adaptable to encircle and thereby attach to either the tire valve 12 or to a tire spoke 14 disposed adjacent to the valve 12. In such manner, the cap 24 is tethered to either one of the spoke 14 or the valve 12 such that, when the cap 24 is removed from the valve end 22, the cap 24 is suspended in space adjacent to the valve end 22 by the flexible retaining member 26 where it can be conveniently located by a user for re-installing back on the valve stem end 22. The valve cover device 10 can be fabricated using conventional manufacturing techniques from a suitable injection moldable plastic material, such as polypropylene or polyethylene.

More particularly, the cap 24 of the cover device 10 has an annular, preferably cylindrical, sidewall 28 and a dome-shaped end wall 30 integrally attached to and closing one end 28A of the sidewall 28. An outwardly-flared or conical rim 32 is integrally attached to and extends about an open opposite end 28B of the sidewall 28. As best seen in FIGS. 3 and 4, the sidewall 28 has a pattern of annular grooves 34 and protrusions 36 formed on its interior surface 38 for providing a releasable force-fitted connection with external threads 22A on the valve stem end 22. More particularly, there is a pair of the annular grooves 34 formed parallel to one another on the half of the sidewall 28 located nearer to the open end 28B and a plurality of offset or staggered ribs or protrusions 36 which project into the cap 24 formed on the other half of the sidewall 28 located nearer to the end wall 30.

The elongated flexible retaining member 26 of the cover device 10 includes an outer annular attaching portion 40 and an inner connecting portion 42 integrally connected to and extending between the outer attaching portion 40 and the rim 32 of the cap 24. The outer annular attaching portion 40 defines an opening 44 being sufficiently large in size to permit the cap 24 to be inserted through the opening 44 in order to secure the outer attaching portion 40 about the tire spoke 14.

Referring to FIGS. 6 and 7, for securing the cover device 10 to the tire valve stem 16, instead of the tire spoke 14, the outer attaching portion 40 of the retaining member 26 has a plurality of flexible teeth 46 which lie generally in a common plane and extend from an inner peripheral edge of the outer portion 40 radially inwardly within the opening 44. As the outer attaching portion 40 of the retaining member is installed over the tire valve stem 16, the flexible teeth 46 will yield and flex so as to allow the valve stem 16 to pass between them through the opening 44 of the outer attaching portion 40. Once the outer attaching portion 40 has been installed in place over the valve stem 16, the flexible teeth 46 spring back sufficiently enought to grip the outer surface 16A of the valve stem 16.

Referring to FIG. 8, in an alternative embodiment of the cover device 10, the elongated retaining member 26 is an elongated strip 48 having a row of spaced openings 50 defined therethrough and at least one and preferably a plurality of spaced apart enlarged heads 52 integrally formed on the strip 48. Each head 52 is slightly larger in cross-sectional size than each opening 50, permitting the heads 52 to be forceably inserted through and withdrawn from a selected one of the openings 50 for firmly securing the retaining member 26 either around the valve stem 16 or about the tire spoke 14.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

I claim:

1. A cover device for protecting an end of a valve o a pneumatic tire having a plurality of spokes, said cover device comprising:
    (a) a hollow cap made solely of semi-flexible semi-rigid material and having an annular sidewall open at one end for removably inserting said cap over an end of a valve of a pneumatic tire, said cap sidewall having at least one protrusion formed on and projecting from an interior surface of said sidewall for providing a releasable force-fitted connection with external threads on the end of the valve; and
    (b) means made solely of the same semi-flexible semi-rigid material as said cap and being integrally connected to said cap for flexibly interconnecting said cap to a spoke of the tire such that said cap remains attached to the spoke regardless of whether said cap is inserted on or removed from the end of the tire valve.

2. The device of claim 1 wherein said cap also has an end wall attached to and closing an opposite end of said sidewall.

3. The device of claim 2 wherein said cap end wall is domed-shaped so as to protrude outwardly from said opposite end of said cap sidewall.

4. The device of claim 2 wherein said cap also has a conical rim extending about and attached to said open end of said cap sidewall.

5. The device of claim 1 wherein said cap sidewall has a pattern of annular grooves formed on an interior surface of said sidewall for providing a releasable force-fitted connection with external threads on the end of the valve.

6. The device of claim 1 wherein said means for flexibly interconnecting said cap with a tire spoke is an elongated flexible retaining member attached to said cap.

7. The device of claim 5 wherein said flexible retaining member includes an inner portion connected to said cap and an outer portion integrally connected to said inner portion and defining an opening being sufficiently large in size to permit said cap to be inserted through said opening in order to secure said outer portion about the tire spoke.

8. The device of claim 6 wherein said flexible retaining member is an elongated strip having an inner portion with a row of spaced openings defined therethrough and an outer portion with at least one enlarged head integrally formed thereon.

9. The device of claim 8 wherein said head on said outer portion of said strip is larger in cross-sectional size than each of said openings defined in said inner portion of said strip to permit said head to be forceably inserted through and withdrawn from a selected one of said openings for firmly securing said retaining member about the tire spoke.

10. A cover device for protecting an end of a valve of a pneumatic tire, comprises:
   (a) a hollow cap made solely of semi-flexible semi-rigid material and having an annular sidewall open at one end and being configured to be releasably force-fitted over an end of a tire valve to protect the valve end; and
   (b) an elongated flexible retaining member made solely of the same semi-flexible semi-rigid material as said cap and including a single inner elongated strip integrally attached at one end to said one open end of said cap and an outer annular strip integrally connected to an opposite end of said inner elongated strip and defining an opening being sufficiently large in size to permit said cap to be inserted through said opening in order to secure said outer annular strip about a tire spoke, said inner and outer strips of said retaining member thereby being bendable to encircle and attach to the tire spoke disposed adjacent to the valve in order to tether said cap to the spoke such that when said cap is removed from the valve end it will be suspended in space adjacent the valve end by said retaining member.

11. The device of claim 10 wherein said cap also has an end wall attached to and closing an opposite end of said sidewall.

12. The device of claim 11 wherein said cap end wall is dome-shaped so as to protrude outwardly from said opposite end of said cap sidewall.

13. The device of claim 11 wherein said cap also has a conical rim extending about and attached to said open end of said cap sidewall.

14. The device of claim 10 wherein said cap sidewall has at least one protrusion formed on and projecting from an interior surface of said sidewall for providing a releasable force-fitted connection with external threads on the end of the valve.

15. A cover device for protecting an end of a valve of a pneumatic tire, comprises:
   (a) a hollow cap made solely of semi-flexible semi-rigid material and having an annular sidewall open at one end and being configured to be releasably force-fitted over an end of a tire valve to protect the valve end; and
   (b) an elongated flexible retaining member made solely of the same semi-flexible semi-rigid material as said cap and including a single inner elongated strip integrally attached at one end to said one open end of said cap and an outer annular strip integrally connected to an opposite end of said inner elongated strip, said outer annular strip defining an opening being sufficiently large in size to permit said outer annular strip to be inserted over the tire valve and a plurality of flexible teeth lying in a common plane and extending radially inwardly within said opening, said teeth being yieldably bendable so as to allow the tire valve to pass between them through said opening as said outer annular strip is inserted over the tire valve and to spring back and grip an outer surface of the tire valve once the outer annular strip is in place over the tire valve, said inner and outer strips of said retaining member thereby being bendable in order to tether said cap to the tire valve such that when said cap is removed from the valve end it will be suspended in space adjacent the valve end by said retaining member.

16. The device of claim 15 wherein said cap sidewall has at least one protrusion formed on and projecting from an interior surface of said sidewall for providing a releasable force-fitted connection with external threads on the end of the valve.

17. A cover device for protecting an end of a valve of a pneumatic tire, comprises:
   (a) a hollow cap made solely of semi-flexible semi-rigid materia and having an annular sidewall open at one end and being configured to be releasably force-fitted over an end of a tire valve to protect the valve end; and
   (b) an elongated flexible retaining member made solely of the same semi-flexible semi-rigid material as said cap and being a single elongated strip including an inner portion integrally attached at one end to said open end of said cap and having a row of spaced openings defined therethrough and an outer portion integrally attached to an opposite end of said inner portion and having at least one enlarged head integrally formed thereon being larger in cross-sectional size than each of said openings defined in said inner portion to permit said head to be forceably inserted through and withdrawn from a selected one of said openings for firmly securing said retaining member about either one of a tire spoke or tire valve, said single elongated strip thereby being bendable to encircle and attach to either the tire spoke or tire valve in order to tether said cap such that when said cap is removed from the valve end it will be suspended in space adjacent the valve end by said retaining member.

18. The device of claim 17 wherein said cap sidewall has at least one protrusion formed on and projecting from an interior surface of said sidewall for providing a releasable force-fitted connection with external threads on the end of the valve.

* * * * *